No. 858,676. PATENTED JULY 2, 1907.
J. C. SLAUGHTER.
SYSTEM OF ELECTRICAL OPERATION.
APPLICATION FILED MAR. 12, 1903.
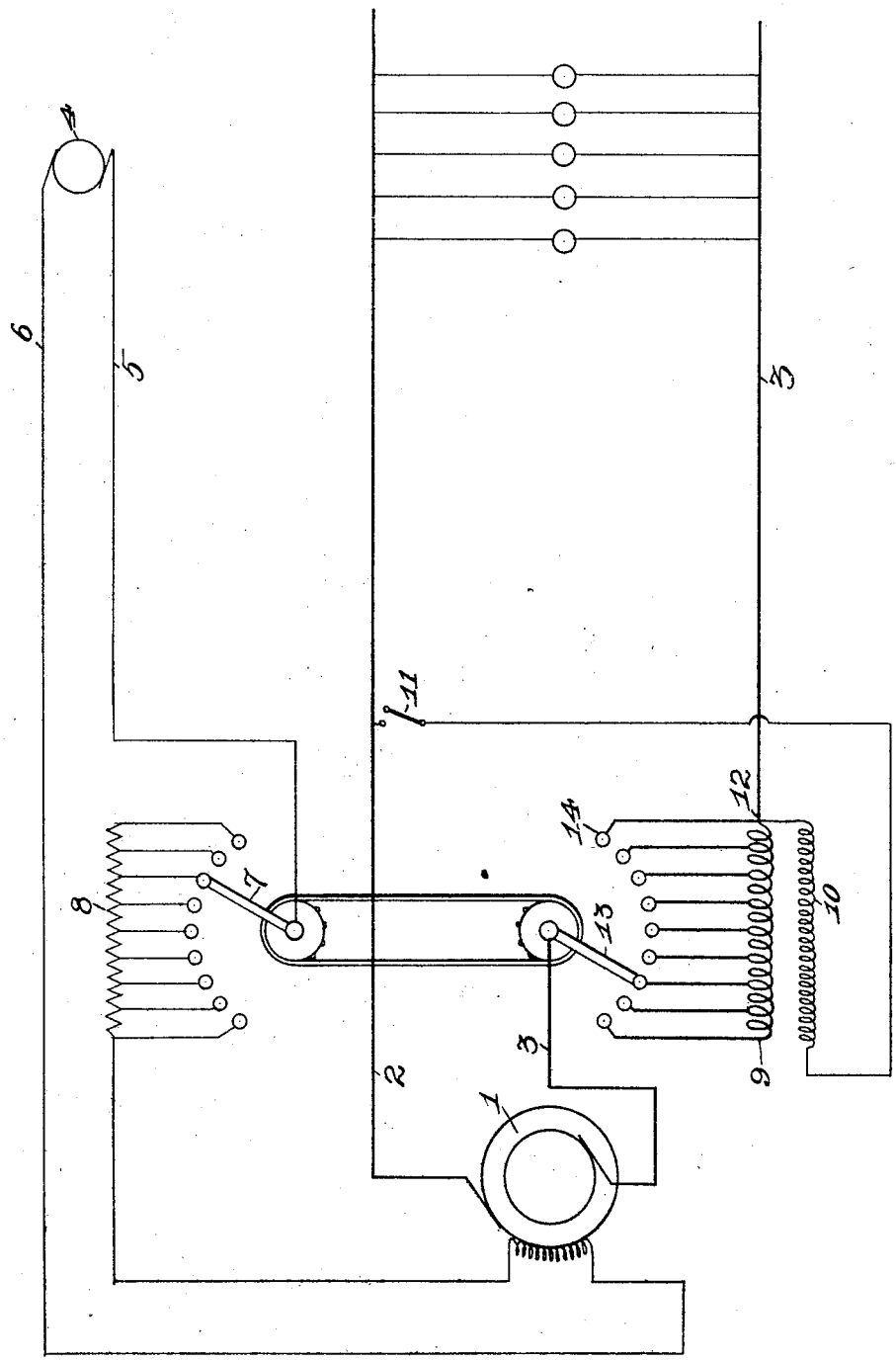

UNITED STATES PATENT OFFICE.

JOEL C. SLAUGHTER, OF DALLAS, TEXAS, ASSIGNOR TO ELECTRIC AUTO-TRANSFORMER COMPANY, A CORPORATION OF MISSOURI.

SYSTEM OF ELECTRICAL OPERATION.

No. 858,676.  Specification of Letters Patent.  Patented July 2, 1907.

Application filed March 12, 1903. Serial No. 147,380.

*To all whom it may concern:*

Be it known that I, JOEL C. SLAUGHTER, a citizen of the United States, residing at Dallas, Dallas county, State of Texas, have invented certain new and useful Improvements in Systems of Electrical Operation, of which the following is a specification containing a full, clear, and exact description, reference being had to the accompanying drawings, forming a part hereof.

The drawing is a diagrammatic view of an alternating current generator system for carrying out my invention.

This invention relates to systems of electrical operation and is adapted to be utilized particularly in connection with alternating currents.

The object of my invention is to provide a system wherein a saving will be effected in the power required to operate a generator during reduced loads, thereby reducing the fuel consumption below that which would be required to operate the systems in use at present.

In the present systems, wherein a constant voltage is maintained, the magnetic losses in the generator when operating under a reduced load, are practically the same as when it is supplying its entire capacity. In my improved system, I decrease the excitation of the generator during reduced loads, and thereby reduce the energy wasted through magnetic reactions. Decreasing the excitation will also reduce the voltage supply of said generator. To maintain the voltage at the desired value, I adjust the output of a voltage raising device in the generator circuit.

Referring to the drawing, 1 indicates an alternating current generator, 2 and 3 the main lines leading from the same. 4 indicates the generator exciter, 5 and 6 indicate wires connecting the exciter 4 to the alternator field. When the wire 5 is connected to the positive brush of the exciter the current will pass from the exciter 4 through the wire 5, through the switch 7, into the rheostat 8, thence to the field of the alternator and return to the exciter through the wire 6.

9 indicates the primary coil of a transformer, this coil is of adjustable value and connected in series on the main line wire 3. 10 indicates the secondary coil which is preferably wound on the same core in close proximity to the primary, one end of this secondary coil is connected to the wire 3 at 12, the other end of said coil being connected to the wire 2 by means of a switch 11.

A switch 13 is connected at one end to the main line wire 3, the other end of said switch being adapted to engage any one of a series of contacts 14, connected to different points in the primary coil 9. I have herein shown a connection between the switches 7 and 13 to cause them to operate simultaneously.

The operation of my improved system is as follows: When the generator is supplying its entire capacity, the switch 7 engages the rheostat contact at the extreme left, thereby removing the resistance of the rheostat 8 from the exciter circuit, the switch 13 engages the contact 14 at the extreme right, thus permitting the entire generator supply to be delivered to the translating devices without going through the adjustable primary coil 9, and if desired, the switch 11 may be open. When the generator is operating under reduced loads, the switch 11 is closed. The switches 7 and 13 are adjusted simultaneously to decrease the field excitation and maintain a predetermined voltage in the generator circuit, *i. e.* the switch 7 is adjusted to introduce a certain amount of resistance into the exciter circuit, thereby reducing the excitation of the generator, hence reducing its magnetic losses. The generator will now supply a reduced voltage, but it will be understood that the switch 13 moved in unison with the switch 7 and placed a portion of the primary coil into the generator circuit, thereby increasing the voltage supplied by said generator.

I am aware that minor changes in the operation of my system can be made without in the least departing from the nature and principle of my invention.

I claim:

1. The herein described method of economically controlling the electrical generation in an alternating generator system during reduced loads which consists in reducing the field excitation and raising the voltage supplied by the generator; substantially as described.

2. The herein described method of economically controlling the electrical generation in an alternating generator system during reduced loads which consists in reducing the field excitation and simultaneously raising the voltage supplied by the generator; substantially as described.

3. The herein described method of economically controlling the electrical generation in an alternating generator system during reduced loads, which consists in adjusting the excitation of the generator field to decrease the magnetic losses in said generator and adjusting the output of a voltage raising device in the generator circuit to maintain a predetermined voltage in said circuit; substantially as described.

4. The herein described method of economically controlling the electrical generation in an alternating generator system during reduced loads, which consists in adjusting the excitation of the generator field to decrease the magnetic losses in said generator and simultaneously adjusting the output of a voltage raising device in the generator circuit to maintain a predetermined voltage in said circuit; substantially as described.

5. The herein described method of economically controlling the electrical generation in an alternating generator system during reduced loads, which consists in decreasing the field excitation and adjusting the output of a transformer in the generator supply circuit to maintain a predetermined voltage in said circuit; substantially as described.

6. The herein described method of economically controlling the output of alternating-generators, which consists in transmitting to the generator-line a current from a voltage-raising device and of higher voltage than the supply, then adjusting the voltage thus supplied to the line during reduced loads to keep the line voltage constant and simultaneously varying the alternator excitation, whereby the generator may operate at the greatest possible economy under the existing load, and cutting out the voltage raising device and permitting the generator to feed directly into the line when the load becomes such that the use of the voltage raising device will no longer affect the economy, substantially as described.

7. The herein described method of economically controlling the output of alternating-generators, which consists in transmitting to the generator-line a current from a voltage-raising device and of higher voltage than the supply, then adjusting the voltage thus supplied to the line during reduced loads to keep the line voltage constant and simultaneously varying the alternator excitation, whereby the generator may operate at the greatest possible economy under the existing load, and alternately cutting out and cutting in the voltage raising device in accordance with the load carried by the generator, substantially as described.

8. The herein described method of economically controlling the electrical generation in an alternating generator system, which consists in raising the voltage supplied by the generator during reduced loads so as to allow the field excitation to be reduced to permit operation at greater economy, and disconnecting the voltage raising device and allowing the generator to feed directly into the line when the use of said device does not effect an economy; substantially as described.

9. The herein described method of economically controlling the electrical generation in an alternating generator system which during reduced loads consists in decreasing the field excitation of the generator, and adjusting the output of a voltage raising device in the generator supply circuit to maintain a predetermined voltage in said circuit and when the generator is operating under full load increasing the field excitation to its normal value also disconnecting the voltage raising device from the generator circuit; substantially as described.

10. The herein described method of economically controlling the electrical generation in an alternating generator system which during reduced loads consists in decreasing the field excitation of the generator, and simultaneously adjusting the output of a voltage raising device in the generator supply circuit to maintain a predetermined voltage in said circuit and when the generator is operating under full load increasing the field excitation to its normal value also disconnecting the voltage raising device from the generator circuit; substantially as described.

In testimony whereof, I have signed my name to this specification, in the presence of two subscribing witness.

JOEL C. SLAUGHTER.

Witnesses:
M. G. IRION,
ALFRED A. EICKS.